Nov. 8, 1960  S. E. TRUESDELL ET AL  2,959,196
MULTIPLE WALL PIPE
Filed Nov. 23, 1955  6 Sheets-Sheet 1
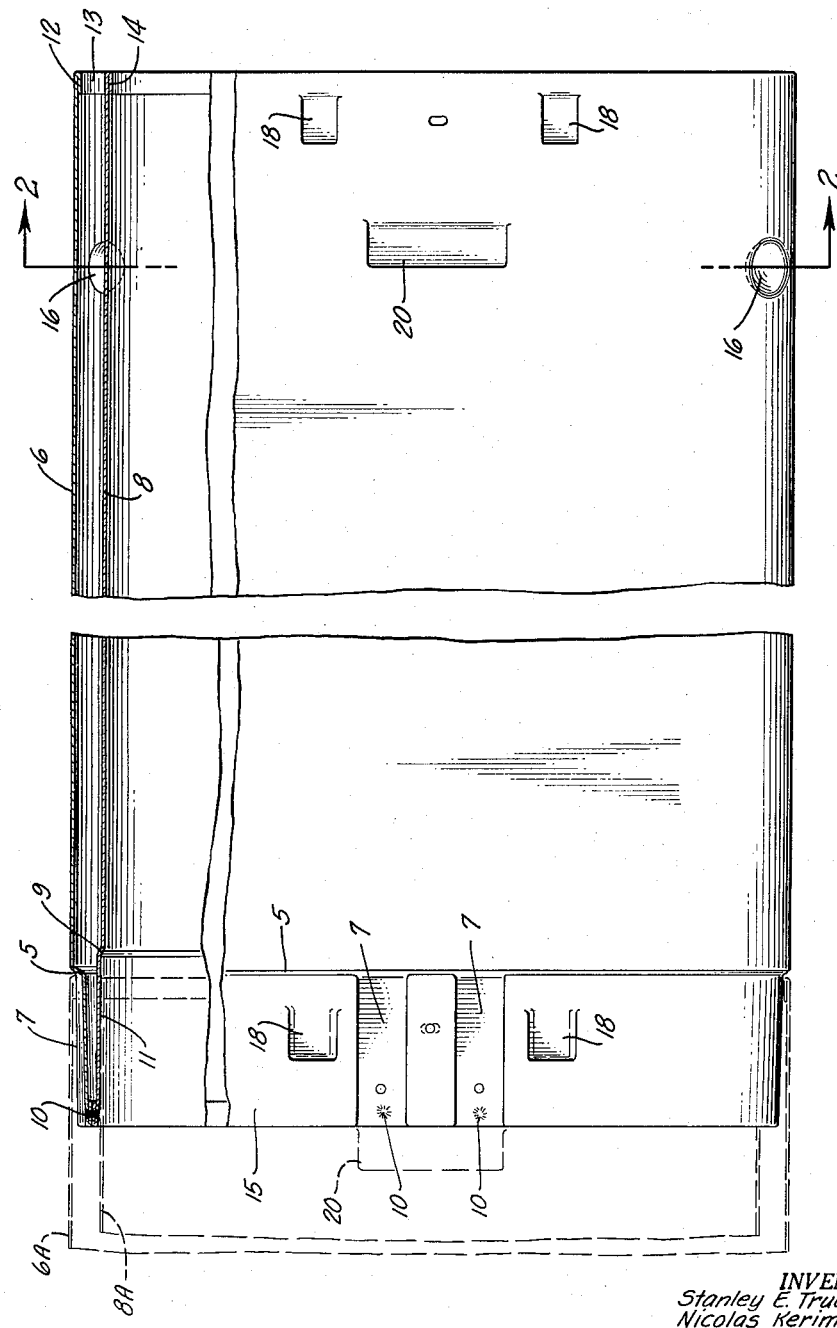
INVENTORS.
Stanley E. Truesdell
Nicolas Kerimly
BY ECKHOFF & SLICK, Attys.
A member of the firm Nov. 8, 1960 S. E. TRUESDELL ET AL 2,959,196
MULTIPLE WALL PIPE
Filed Nov. 23, 1955 6 Sheets-Sheet 2
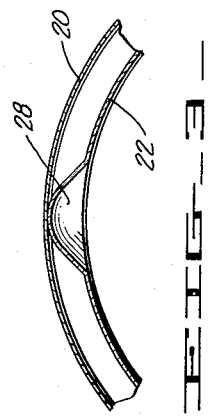
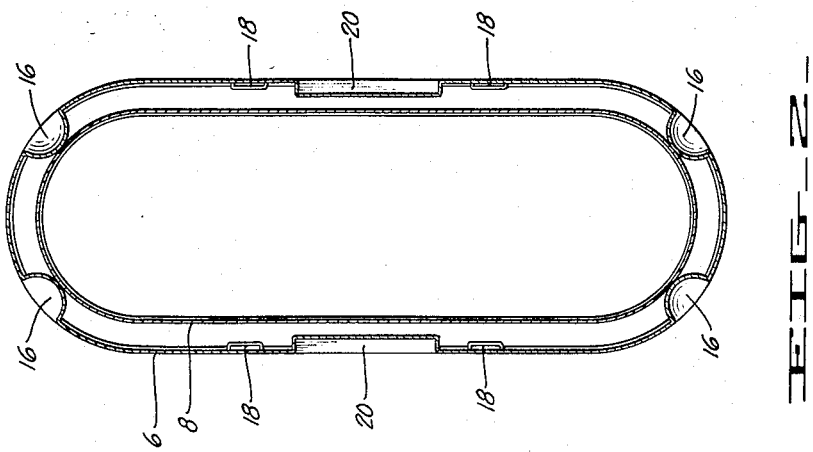
INVENTORS,
Stanley E. Truesdell
Nicolas Kerimly
BY ECKHOFF & SLICK, Attys.
A member of the firm

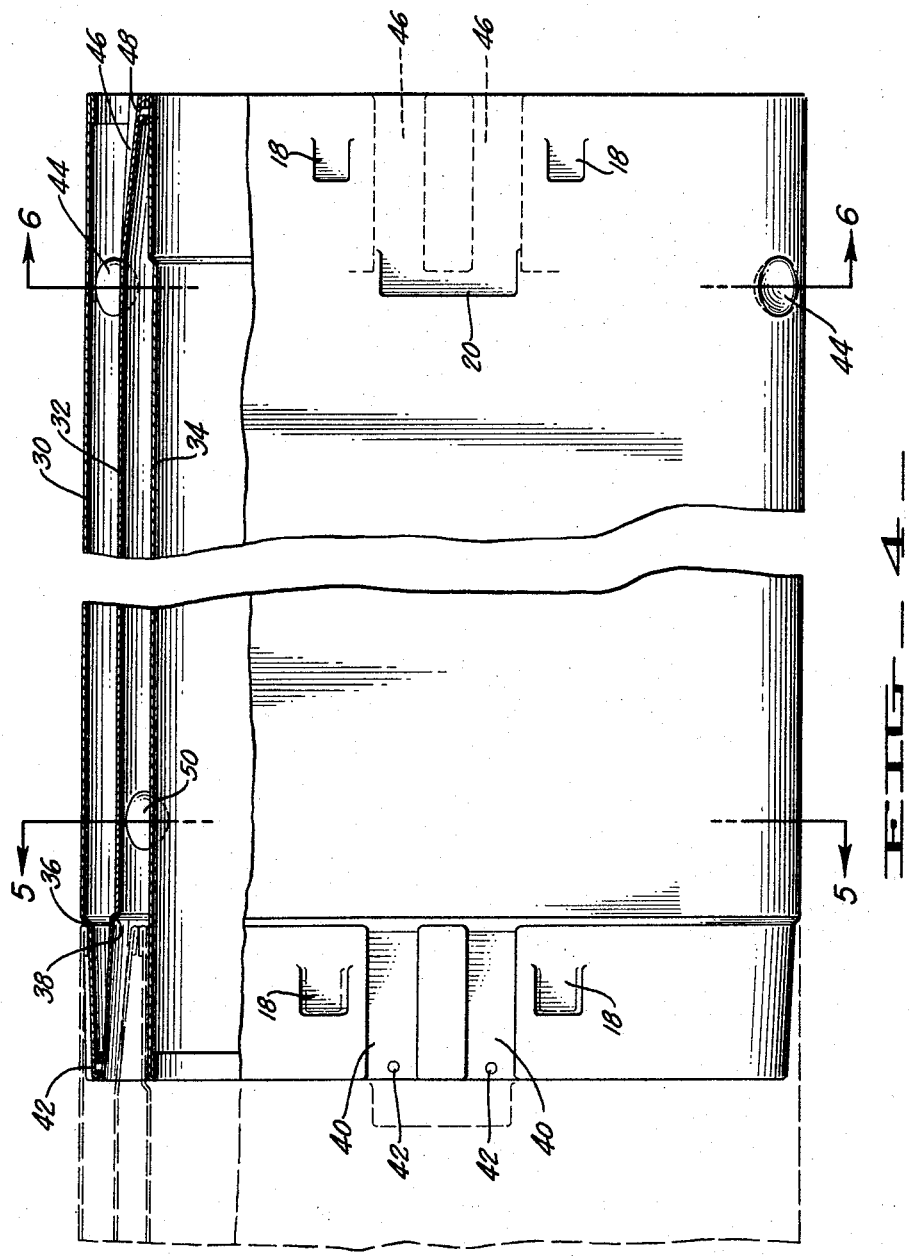

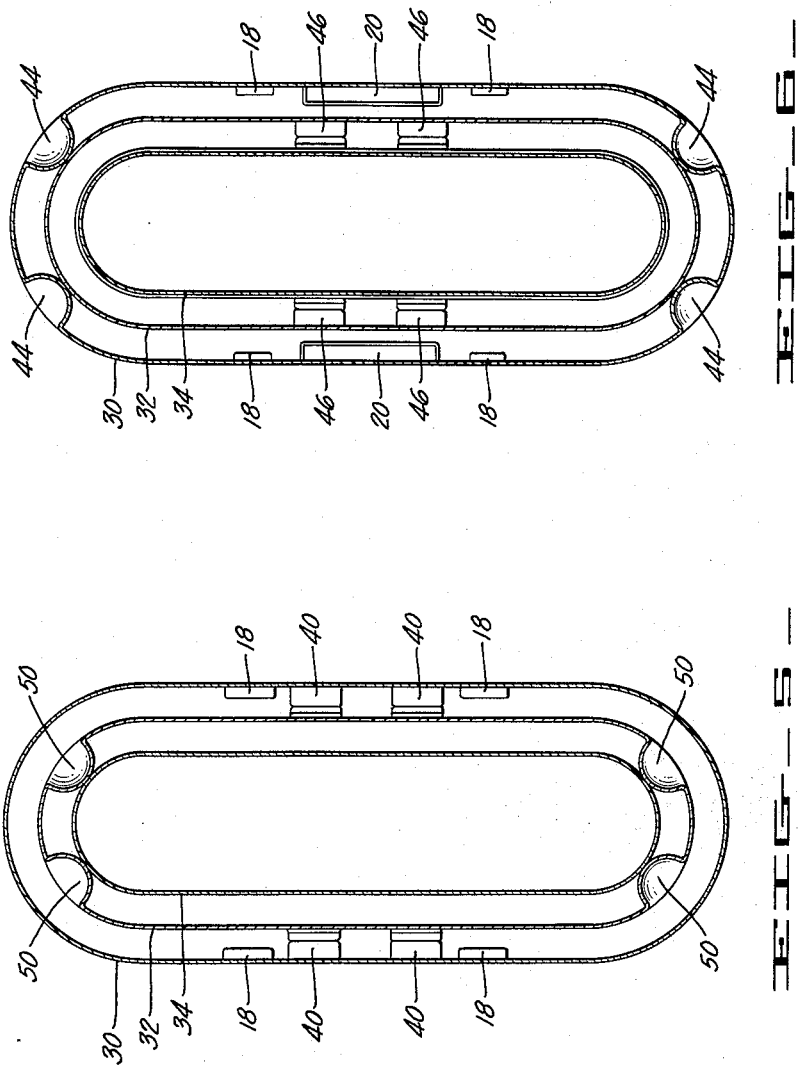

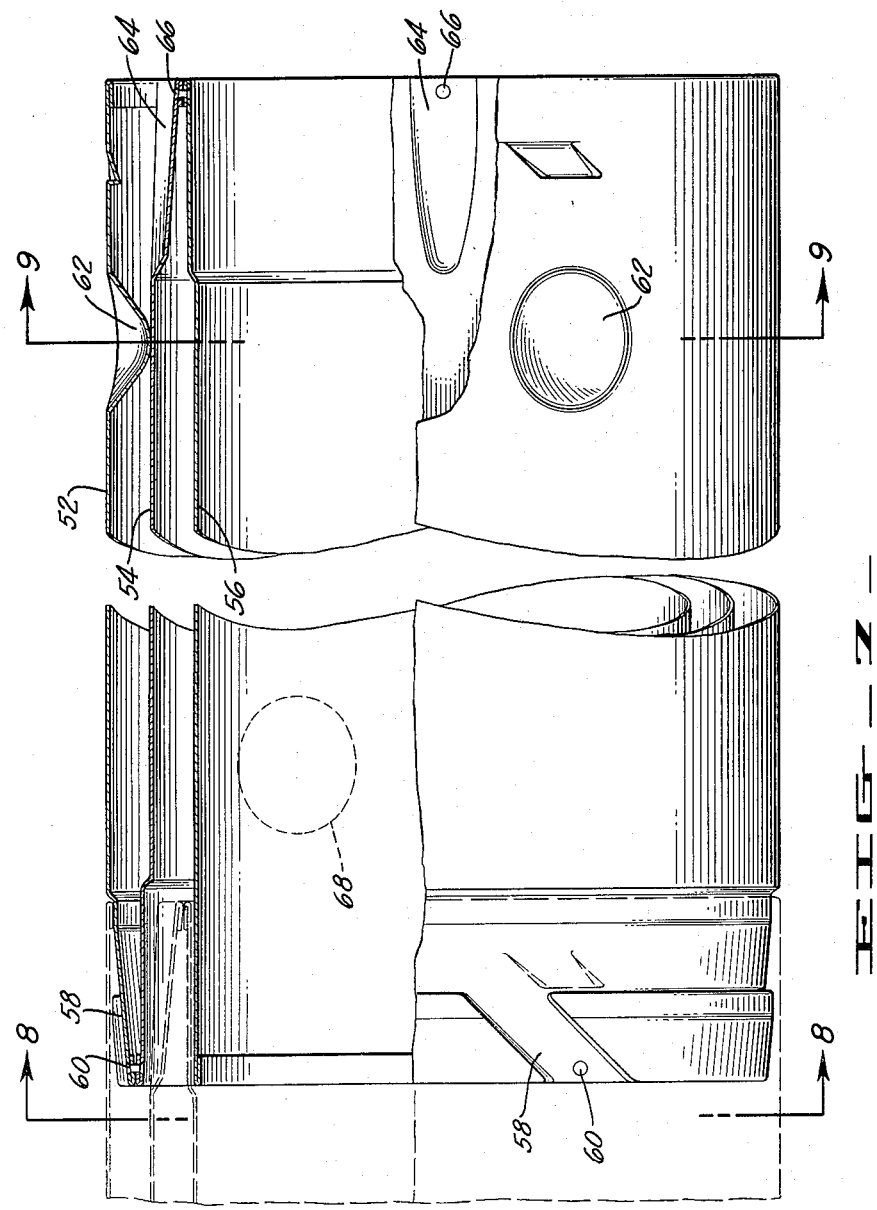

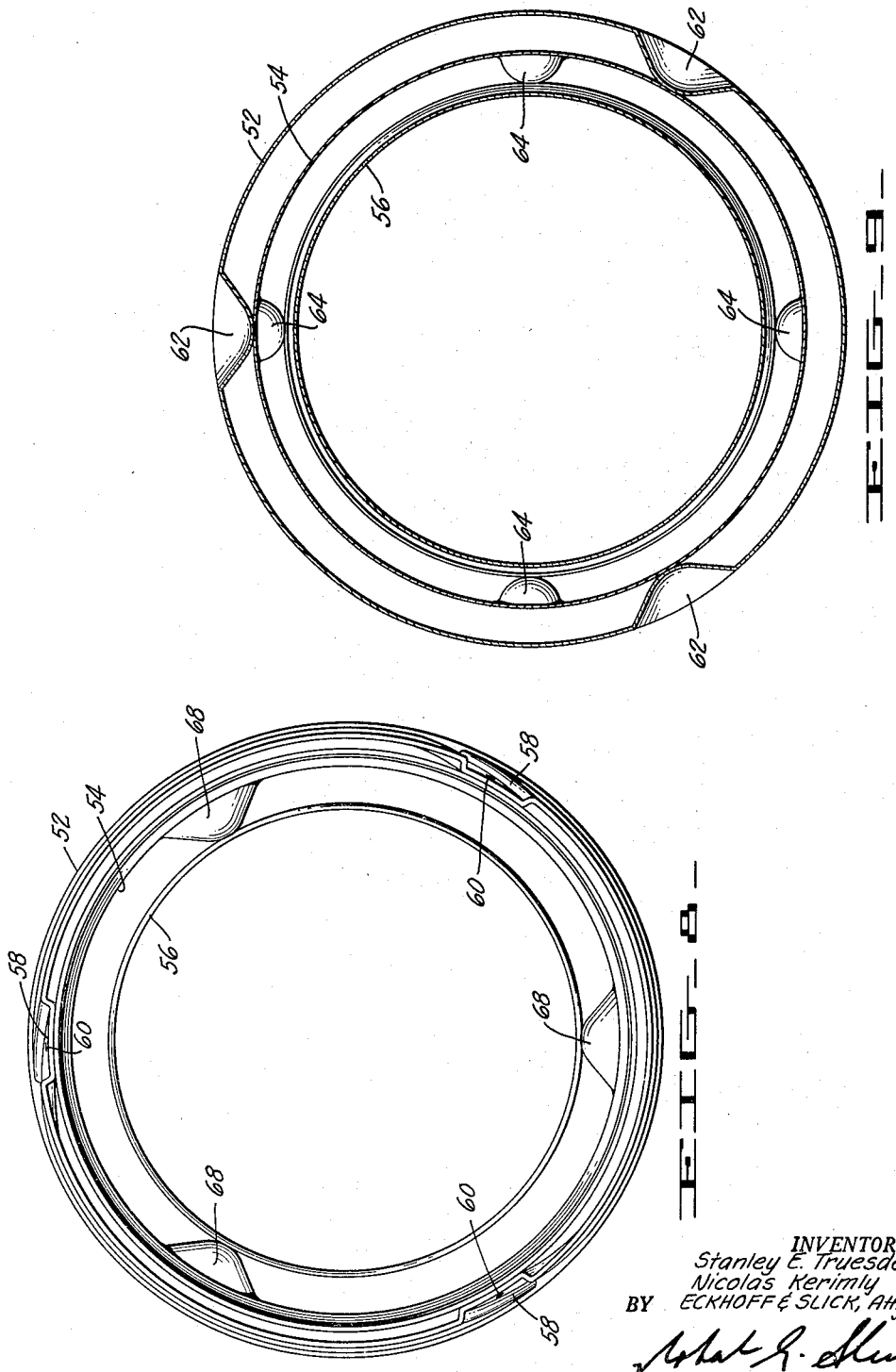

United States Patent Office
2,959,196
Patented Nov. 8, 1960

2,959,196

MULTIPLE WALL PIPE

Stanley E. Truesdell, Redwood City, and Nicolas Kerimly, Sacramento, Calif., assignors, by mesne assignments, to Dura-Vent Corporation, Wilmington, Del., and Redwood City, Calif., a corporation of Delaware Filed Nov. 23, 1955, Ser. No. 548,570

1 Claim. (Cl. 138—63)

This invention relates to multiple walled vent pipes and, more particularly, relates to a method for holding the double walls of such pipes concentric.

Multiple walled vent pipes are in common use because of their many advantages over either single wall vent pipes or masonry construction. Commonly such pipes are made with two walls but three or even more walls may be used. Such pipes may be installed at a minimum of expense and require little space since they are small in size and may be installed quite close to the structural parts of a building. However, the multiple walled vent pipes heretofore available have been rather expensive because of complicated means which have heretofore been thought necessary to hold the pipes concentric. According to the present invention, the pipes are held concentric by means of dimples in at least one of the pipes. In this manner, a simple, inexpensive, yet effective, structure is achieved.

In the drawings forming a part of this application:

Figure 1 is a side view, partly in section, of a two walled oval pipe made in accordance with the present invention.

Figure 2 is a section on the lines 2—2 of Figure 1.

Figure 3 is a fragmentary section showing an alternate construction.

Figure 4 is a side view, partly in section of a triple walled oval pipe made in accordance with the present invention.

Figure 5 is a section on the lines 5—5 of Figure 4.

Figure 6 is a section on the lines 6—6 of Figure 4.

Figure 7 is a side view, partly in section of a triple walled round pipe.

Figure 8 is a section on the lines 8—8 of Figure 7.

Figure 9 is a section on the lines 9—9 of Figure 7.

Referring now to the drawings by reference characters, there is shown in Figures 1 and 2 a composite, double walled pipe having an outer wall 6 and an inner wall 8. The outer pipe 6 has a shoulder 5 formed near one end thereof and the inner pipe 8 has an inwardly directed shoulder 9 corresponding thereto. As a result of the pipes having these shoulders, the pipe 6 has a reduced periphery at the end, as at 15, while the pipe 8 has an increased periphery as at 11. That portion of the pipe at 15 has a series of pressed in, ramp-like indentations 7. The indentations 7 and the wall 11 are thus brought together and fastened at their points of meeting 10 by any suitable means. In the embodiment shown in Figure 1, there are six such points of contact which are joined by a series of spot welds. Further, it is possible to employ a lesser or larger number of indentations 7. At their opposite ends, the pipes 6 and 8 are bent over as at 12 and 14 respectively to form a female fitting 13. The method of joining two sections of pipe together is shown in dotted lines at the left-hand side of Figure 1 wherein the pipe sections 6A and 8A are shown meshed over the pipe sections 6 and 8.

In accordance with one embodiment of the present invention, the pipes are held concentric at the female end by means of a series of dimples 16 in the outer pipe. These dimples extend inwardly from the outer pipe and serve as a simple and effective means for holding the two pipes concentric. Although the dimples have been shown in Figures 1 through 4 as extending inwardly from the outer pipe, it is obvious that it would be just as effective to extend the dimples outwardly from the inner pipe, such as at 28 in Figure 5.

In Figures 4 through 9, triple walled pipes are shown and by following the methods illustrated, pipes with any number of walls may be formed.

Referring specifically to Figures 4 through 6, a composite oval pipe is shown having three walls designated 30, 32 and 34. Wall 30 has an inwardly directed shoulder 36, while wall 32 has an outwardly directed shoulder 38. The outer wall has a series of indentations 40 and the two walls are joined at the indentations as at 42. At the opposite end, the walls are held concentric by the dimples 44 in the outer wall. Substantially similar construction is employed to hold walls 32 and 34 concentric but at opposite ends. Thus, the wall 32 is provided with a series of indentations 46 and the walls are jointed at points 48, while the dimples 50 hold the opposite ends concentric.

In exactly the same manner, a triple walled round pipe is formed as in Figures 7 through 9. Here, walls 52, 54 and 56 are employed. The walls 52 and 54 are held concentric at one end by means of the indentations 58 and the fastening at 60 while at the opposite end the dimples 62 hold the pipes concentric at one end by the indentations 64 and the fastening at 66, and at the opposite end are held concentric by the dimples 68.

In addition to the specific features discussed, the pipes may have locking tabs 18 and the outer sleeve may have ventilating slots 20, but these form no part of the present invention.

The composite pipe of the present invention may be made of any thin, strong material such as sheet iron, galvanized sheet iron or aluminum. One particularly advantageous construction has an inner pipe of aluminum and an outer pipe or pipes of galvanized sheet iron. In this manner, a structure is produced which is light, strong and corrosion-resistant.

In the embodiments illustrated, the round pipes are shown with three dimples and the oval pipe with four dimples, but it is obvious that other numbers of dimples can be utilized.

I claim:

A section of multiple wall pipe having an inner metal wall and an outer metal wall, said inner and outer walls being of approximately equal length, said inner and outer walls being arranged in a concentric relationship and ending in the same terminal planes; a male fitting at one end of said section, said male fitting consisting of a shoulder spaced somewhat from one end of said outer wall, that portion of said outer wall between said one end thereof and said shoulder being of reduced diameter; and a shoulder on said inner wall in a transverse plane somewhat inwardly of the plane of the shoulder on the outer wall, that portion of said inner wall between said shoulder of said inner wall and said one end thereof being of increased diameter whereby to approach the decreased-diametered portion of said outer wall and having a smooth surfaced inner face, the area of increased diameter and the area of decreased diameter of the respective walls terminating at a point where said portions are closely adjacent one another; a plurality of indentations in one of said areas between a shoulder and a terminal end of one wall of sufficient depth that said indentations contact an adjacent surface of the other of said walls; said walls being fixedly secured together where said indentations contact said adjacent surface, the terminal portion of each wall being folded back upon itself at the second end of said section to form a female receptacle having spaced walls of sufficient width to receive a male fitting of the type on the opposite end of said pipe section; a plurality of dimples adjacent the end of said pipe bearing said female receptacle, extending from one of said pipes in the direction of the other of said pipes, said dimples being solely in one of said pipes and touching the adjacent pipe and being solely in frictional engagement therewith, said dimples constituting the sole means for holding said walls in a concentric relationship at the end thereof bearing said female fitting, said female fitting having locking means therein and said male fitting having locking means suitable for registration with said locking means on said female fitting when male and female fittings on different pipe sections are forced into engagement.

References Cited in the file of this patent

UNITED STATES PATENTS

| | | |
|---|---|---|
| 1,349,284 | Lavigne | Aug. 10, 1920 |
| 2,512,116 | Siebels | June 20, 1950 |
| 2,633,338 | Hiersch | Mar. 31, 1953 |
| 2,634,759 | Twickler | Apr. 14, 1953 |
| 2,679,867 | Epstein | June 1, 1954 |